United States Patent [19]
Dähler et al.

[11] Patent Number: 5,999,427
[45] Date of Patent: Dec. 7, 1999

[54] INVERTOR WITH SUPPRESSION OF INTERFERENCE CURRENTS

[75] Inventors: Peter Dähler, Remigen; Osvin Gaupp, Baden; Gerhard Linhofer, Baden-Dättwil, all of Switzerland; Jean-François Ravot, Chevry, France

[73] Assignee: Asea Brown Boveri AG, Baden, Switzerland

[21] Appl. No.: 09/116,936

[22] Filed: Jul. 17, 1998

[30] Foreign Application Priority Data

Aug. 22, 1997 [DE] Germany ............................ 197 36 614

[51] Int. Cl.[6] .................................................. H02M 7/00
[52] U.S. Cl. .............................................. 363/71; 363/41
[58] Field of Search ................................. 363/71, 41, 40, 363/65

[56] References Cited

U.S. PATENT DOCUMENTS

| | | | |
|---|---|---|---|
| 5,065,303 | 11/1991 | Nguyen et al. | 363/40 |
| 5,434,771 | 7/1995 | Danby et al. | 363/71 |
| 5,508,905 | 4/1996 | Reichard | 363/71 |
| 5,666,278 | 9/1997 | Ng et al. | 363/71 |

FOREIGN PATENT DOCUMENTS

| | | |
|---|---|---|
| 3602496A1 | 7/1987 | Germany . |
| 3602496C2 | 7/1987 | Germany . |
| 61-109472A | 5/1986 | Japan . |

OTHER PUBLICATIONS

"Die Brucke zwischen den Systemen", Steinbach, Elektrische Bahnen 89, 1991, pp. 187–188.

"Bremen's 100–MW static frequency link", Boeck, et al., ABB Review, ed. Sep. 10, 1996, ABB Asea Brown Boveri Ltd. Zürich/Switzerland, published Sep. 1996, pp. 4–17.

*Primary Examiner*—Shawn Riley
*Attorney, Agent, or Firm*—Burns, Doane, Swecker & Mathis, L.L.P.

[57] ABSTRACT

An invertor (15) includes a plurality of invertor bridges (B1, . . . ,B8), which are connected in parallel and whose output voltages are summed via a transformer (19). The transformer (19) has a number of primary windings (P1, . . . ,P8) and associated secondary windings (S1, . . . ,S8) which corresponds to the number of invertor bridges (B1, . . . ,B8). Each invertor bridge (B1, . . . ,B8) is connected on the output side to one of the primary windings (P1, . . . ,P8), and the secondary windings (S1, . . . ,S8) are connected in series to sum the output voltages. The transformer (19) has a center tap (23) which is grounded via a ground connection (24). Tertiary windings (T1, . . . ,T8) are assigned to the primary windings (P1, . . . ,P8) and to the secondary windings (S1, . . . ,S8). The tertiary windings (T1, . . . ,T8) are also connected to a common-mode filter (51). The common-mode filter (51) is tuned to common mode interference voltages associated with in-phase or common-mode interference currents flowing via the ground connection (24). Thus, a circuit is formed that attenuates or suppresses the in-phase or common-mode interference currents and the associated interference voltages.

9 Claims, 6 Drawing Sheets

5,999,427

INVERTOR WITH SUPPRESSION OF INTERFERENCE CURRENTS

BACKGROUND OF THE INVENTION

1. Field of the Invention

The present invention is concerned with the field of power electronics. It relates to an invertor comprising a plurality of invertor bridges, which are operated in parallel on the same DC voltage intermediate circuit and whose output voltages are summed via a transformer, which transformer has a number of primary windings and associated secondary windings which corresponds to the number of invertor bridges, each invertor bridge being respectively connected on the output side to a primary winding, and the secondary windings being connected in series for the purpose of summing the output voltages, and the invertor bridges each being driven with pulse duration modulation according to an auxiliary control voltage, and the auxiliary control voltages of the individual invertor bridges having a constant phase difference between one another, and the transformer having a center tap, which is grounded via a ground connection.

2. Discussion of Background

In order to connect electricity supply systems having a different number of phases and/or AC voltage frequency, such as e.g. between a 50 Hz three-phase power supply system and a single-phase 16 ⅔ Hz railway grid, use is increasingly being made of solid-state couplings and railway power converters which are equipped with power semiconductors and are often designed as converters having a DC voltage intermediate circuit. In accordance with FIG. 1, such a railway power converter 10 comprises, for example, a (thyristor-equipped) converter 13 which draws the three-phase current from the three-phase power supply system 11 via a transformer 12 and converts it into a direct current, a DC voltage intermediate circuit 14 for smoothing and/or buffer-storage, and an invertor 15 which converts the direct current back into an alternating current at the desired frequency and feeds it into the railway grid 16.

In the invertor 15, use is usually made of one or more invertor bridges, operating in parallel, with switchable valves (e.g. GTOs), which are driven with pulse duration modulation and approximate the desired sinusoidal output voltage by a sequence of duration-modulated square-wave pulses of alternating polarity. A triangular-waveform auxiliary control voltage is usually used in this case for the pulse duration modulation. Details about the driving can be found for example in an offprint (No. 9608-1000-0) from the applicant "Vollstatische 100-MW-Frequenzkupplung Bremen" [Solid-state 100 MW frequency coupling Bremen]. If a plurality of invertor bridges are operated in parallel, the output voltages are summed. A reduction in the harmonic content is achieved by driving the individual invertor bridges via the auxiliary control voltages in a phase-shifted manner.

An example of the structure of an invertor 15 is represented in FIG. 2. The invertor 15 of this example comprises eight invertor bridges B1, . . . ,B8 which operate in parallel and, with a respective capacitor C1, . . . ,C8 in parallel at the inputs, are connected to the input lines 17, 18 coming from the DC voltage intermediate circuit 14. A transformer 19 is provided for the purpose of summing the output voltages of the invertor bridges B1, . . . ,B8, which transformer contains a winding pair comprising a primary winding P1, . . . ,P8 and a secondary winding S1, . . . ,S8 for each of the invertor bridges B1, . . . ,B8. The outputs of the invertor bridges B1, . . . ,B8 are respectively connected to the corresponding primary windings P1, . . . ,P8; the secondary windings S1, . . . ,S8 are connected in series. The summed output signal is available on the output lines 20, 21. In order to suppress harmonics, the transformer 19 may additionally be equipped with tertiary windings T1, . . . T8, which are connected in series and are damped by a corresponding filter circuit 25 (in this respect see, for example, EP-B1-0 149 169). Examples of duration-modulated and phase-shifted pulse trains for the invertor bridges B1, . . . ,B8 are represented in FIG. 3. Summation of the individual pulse trains in the transformer 19 produces therefrom the resultant summation voltage $u_{Bi}$ in FIG. 4.

Problems with the type of invertor illustrated in FIG. 2 arise if—as is necessary in the case of some railway grids— the transformer 19 of the invertor 15 is grounded at a center tap 23 by a ground connection 24 via a resistor 22 (or else without a resistor, that is to say in "hard" fashion) (see FIG. 2). These problems may be illustrated with reference to the equivalent circuit diagrams represented in FIGS. 5 to 8: The invertor, which operates as a voltage source converter (Voltage Source Converter, VSC), can be described in principle (FIG. 5) by a voltage source 26 having the voltage $u_{Bi}$ which drives a corresponding current $i_{Bi}$ through a circuit formed by the impedances 27,28 and 29. The impedances 27 and 28 with the values $z_1$ and $z_2$, respectively, represent the transformer 19 and the impedance 29 with the value $z_3$ represents the filter circuit 25. The railway grid 16 can be described in the equivalent circuit diagram by the impedance 30 ($z_4$) and the voltage source 31.

As a result of the grounding (via the resistor 22) at the center tap 23 of the transformer 19, the equivalent circuit diagram of the VSC from FIG. 5 can be converted into an equivalent circuit diagram in accordance with FIG. 6. The voltage source 26 is in this case divided into two voltage sources 32 and 33 having the partial voltages $u_{Bi,a}$ and $u_{Bi,b}$, where:

$$u_{Bi}=u_{Bi,a}-u_{Bi,b} \tag{1}$$

The impedances 27 and 28 of the transformer 19 are now divided in FIG. 6 into impedances 34 and 39 and, respectively, 35 and 40, in each case having half the original impedance value, namely $z_1/2$ and $z_2/2$. The impedance 29 with the value $z_3$ is preserved while the impedance 30 and the voltage source 31 of the railway grid 16 are likewise divided into the impedances 36 and 41 (in each case having the value $z_4/2$) and, respectively, voltages sources 42 and 43. The grounding via the center tap 23 of the transformer 19 is represented by the resistor 37 having the value $R_E$ in FIG. 6. A corresponding resistor 38 having the value $R_{E,r}$ describes the total remote grounding resistance of the railway grid 16.

According to the concept of modal decomposition, the equivalent circuit diagram of FIG. 6 can be decomposed into two superposed subsystems, namely into the common mode system and the differential mode system. The two superposed systems can then be treated separately from one another and the resultant currents and voltages simply added at the end of the analysis in order to obtain the real physical quantities. The equivalent circuit diagram in the common mode system for the upper half of the VSC is represented in FIG. 7. In addition to the already known impedances 34, 35 and 36, the circuit contains the resistors 45 and 46, which each amount to twice the grounding resistors 37 and 38, respectively. The voltage source 44 outputs a voltage $u_{Bi,CM}$ which drives a current $i_{Bi,CM}$ through the circuit. The equivalent circuit diagram in the differential mode system for the upper half of the VSC is illustrated in FIG. 8. In addition to the already known impedances 34, 35 and 36, the impedance 48 is present here as well, which impedance corresponds to half the impedance 29 and is characteristic of the filter circuit 25. The voltage source 47 outputs a voltage $u_{Bi,D}$ which drives a current $i_{Bi,D}$ through the circuit.

The following relationship emerges for the voltages and currents:

$$u_{Bi,a} = u_{Bi,CM} + u_{Bi,D} \quad (2)$$

$$u_{Bi,b} = u_{Bi,CM} - u_{Bi,D} \quad (3)$$

and also $$i_{Bi} = i_{Bi,CM} + i_{Bi,D} \quad (4)$$

and $$i_E = 2 * I_{Bi,CM}. \quad (5)$$

It is immediately evident from FIGS. 5 to 8 and equations (1) to (5) that the common mode voltage $u_{Bi,CM}$ is undesirable because it drives a common mode current $i_{Bi,CM}$ which can flow back only through the grounding resistors 37 and 38. The level of the common mode current $i_{Bi,CM}$ is primarily limited by the impedances $z_1$ and $z_2$ of the transformer 19. The common mode current $i_{Bi,CM}$ has two disadvantageous effects:

It causes considerable losses both in the local grounding resistor 22 or 37 and in the remote grounding resistor 38. As shown by simulations of a real plant (approximately 50 MW), the losses in the grounding resistor 22 (at a nominal resistance of $R_E=334$ Ω) can be approximately 50 kW and are therefore of an unacceptable order of magnitude.

In the railway grid (for example a 138 kV grid), it can cause interference in adjacent communications equipment.

SUMMARY OF THE INVENTION

Accordingly, one object of the invention is to provide a novel VSC invertor in which the currents flowing via the ground connection are suppressed or attenuated to a harmless value.

In the case of an invertor of the type mentioned in the introduction, the object is achieved by virtue of the fact that, in order to attenuate or suppress in-phase or common-mode interference currents flowing via the ground connection and the interference voltages associated with said interference currents, within the transformer, tertiary windings are assigned to the primary windings and to the secondary windings, and the tertiary windings are connected to form a circuit in such a way that the undesirable common-mode interference voltages or interference currents are kept away from the power supply system and from the ground connection.

A first preferred embodiment of the invention is distinguished by the fact that each pair of primary and secondary windings is respectively assigned a tertiary winding, that the tertiary windings above the center tap and the tertiary windings below the center tap are in each case connected in series, that the mutually corresponding outputs of the two series circuits are respectively connected together, that the first mutually corresponding outputs of the two series circuits are connected together directly, that a common mode filter is arranged between the second mutually corresponding outputs of the two series circuits, and that the common mode filter is designed as a 2nd order high-pass filter. As a result of this it is possible, with relatively little additional circuitry, reliably to attenuate the common mode interference voltages up to the higher harmonics in a targeted manner.

At the same time, the tertiary windings can also be used in a conventional manner for AC filtering if, in accordance with a preferred development of the embodiment, an AC filter is respectively connected in parallel with each of the series circuits formed by the tertiary windings.

Further embodiments emerge from the dependent claims.

An invertor according to the invention is preferably used in a converter having a DC voltage intermediate circuit, in particular in a railway power converter or a frequency coupling.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
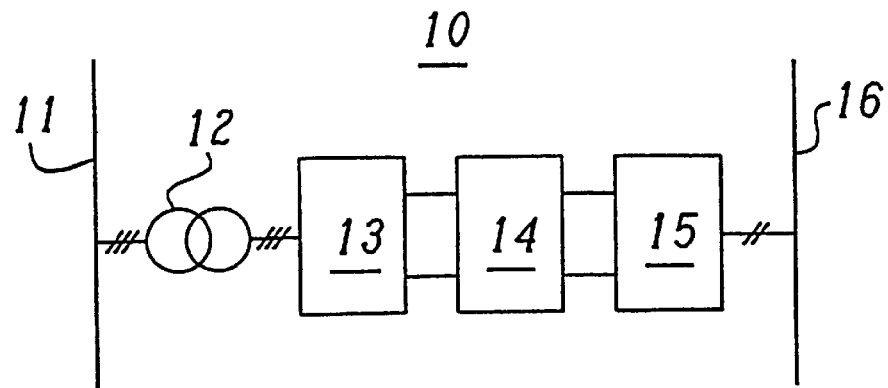
FIG. 1 shows the fundamental structure of a railway power converter.
Figure 2:
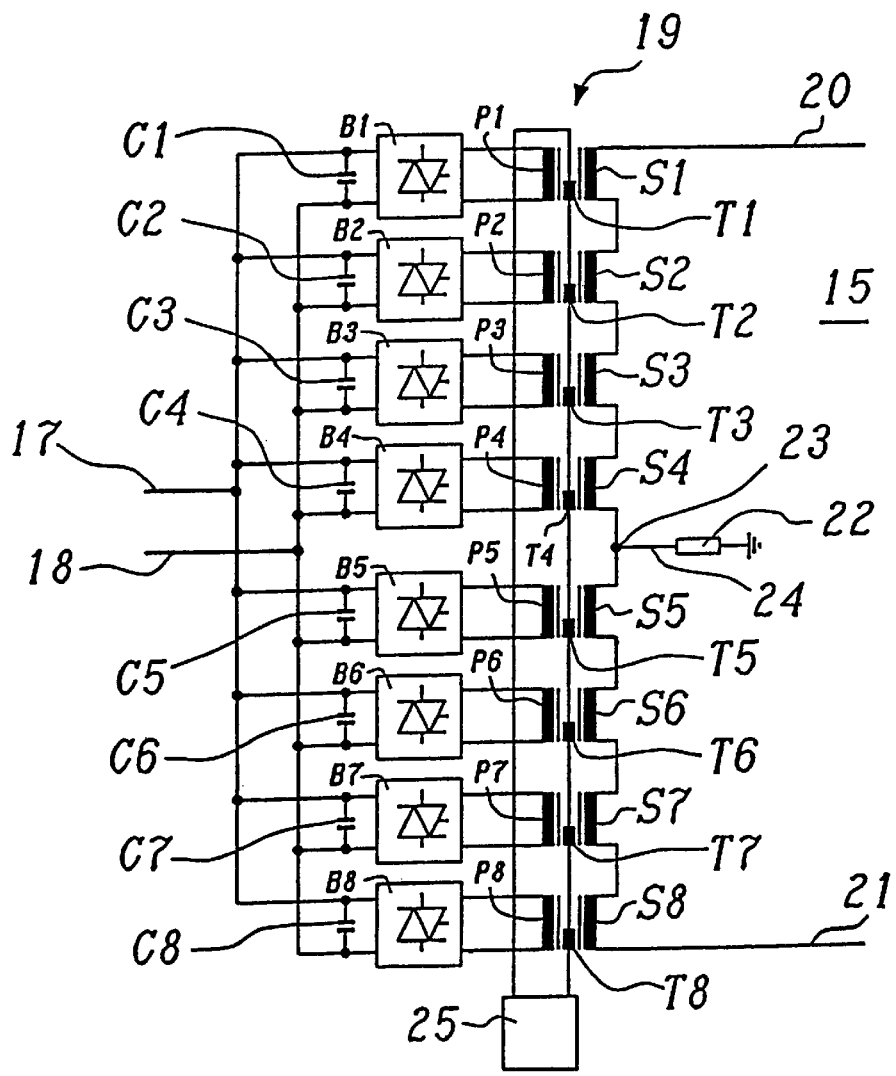
FIG. 2 shows the block diagram of an invertor, suitable for the railway power converter according to FIG. 1, with a plurality of invertor bridges in parallel and with center-point grounding of the transformer.
Figure 3:
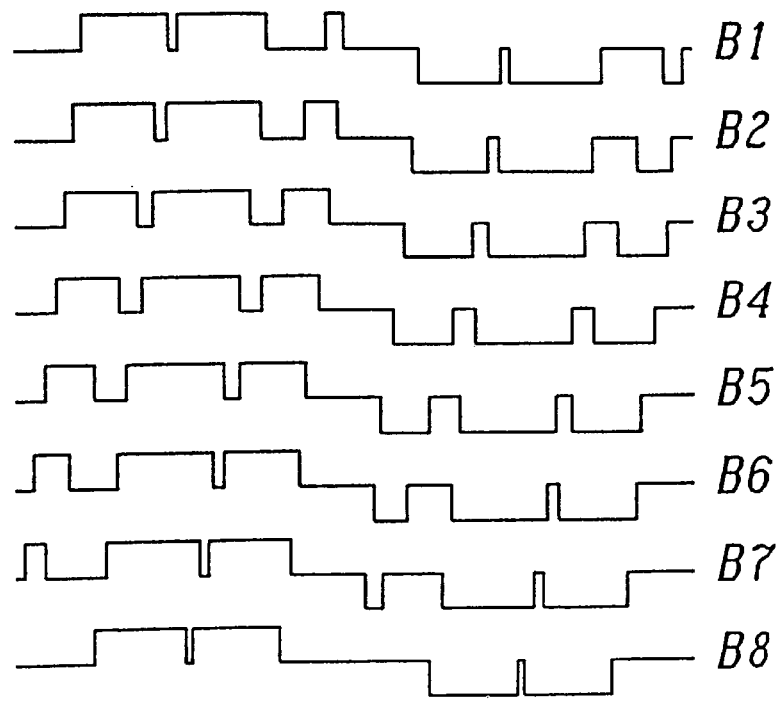
FIG. 3 shows examples of pulse duration-modulated output pulse trains of the individual invertor bridges from FIG. 2.
Figure 4:
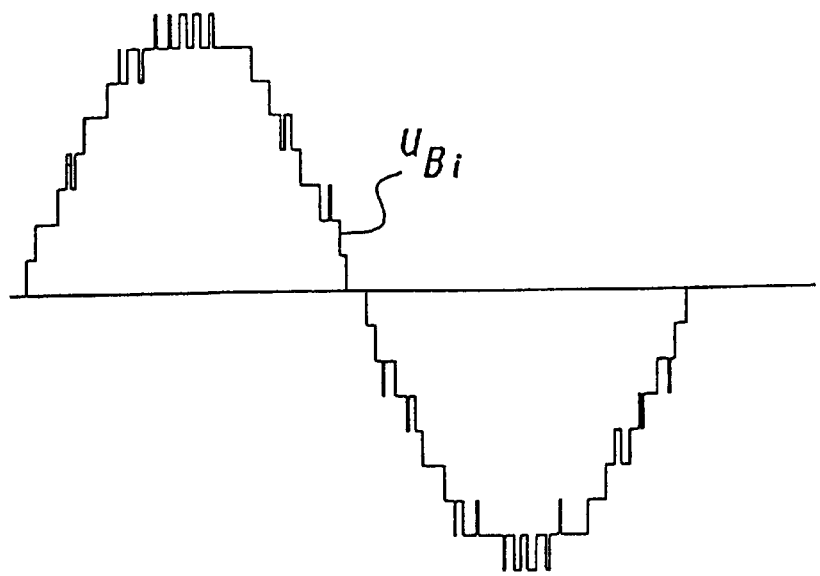
FIG. 4 shows the summation voltage resulting from summation of the output pulse trains from FIG. 3.
Figure 5:
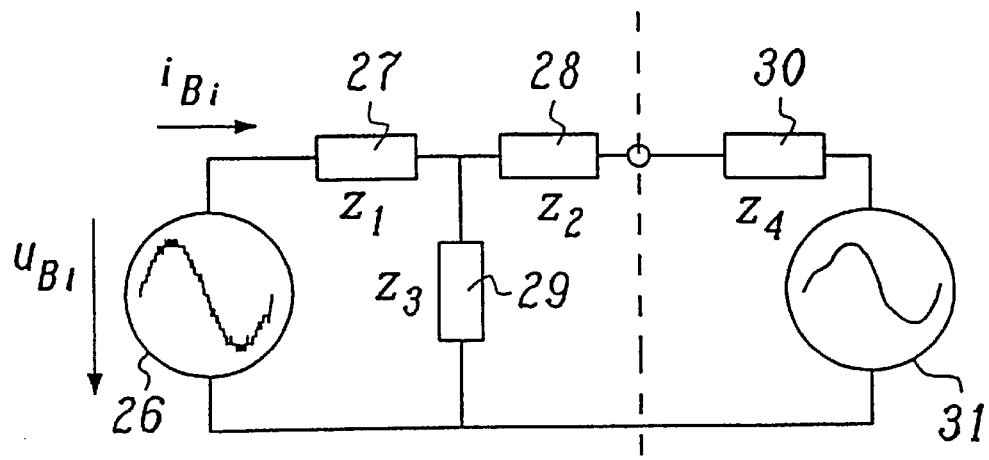
FIG. 5 shows the equivalent circuit diagram of the invertor (connected to the railway grid) from FIG. 4 without center-point grounding of the transformer.
Figure 6:
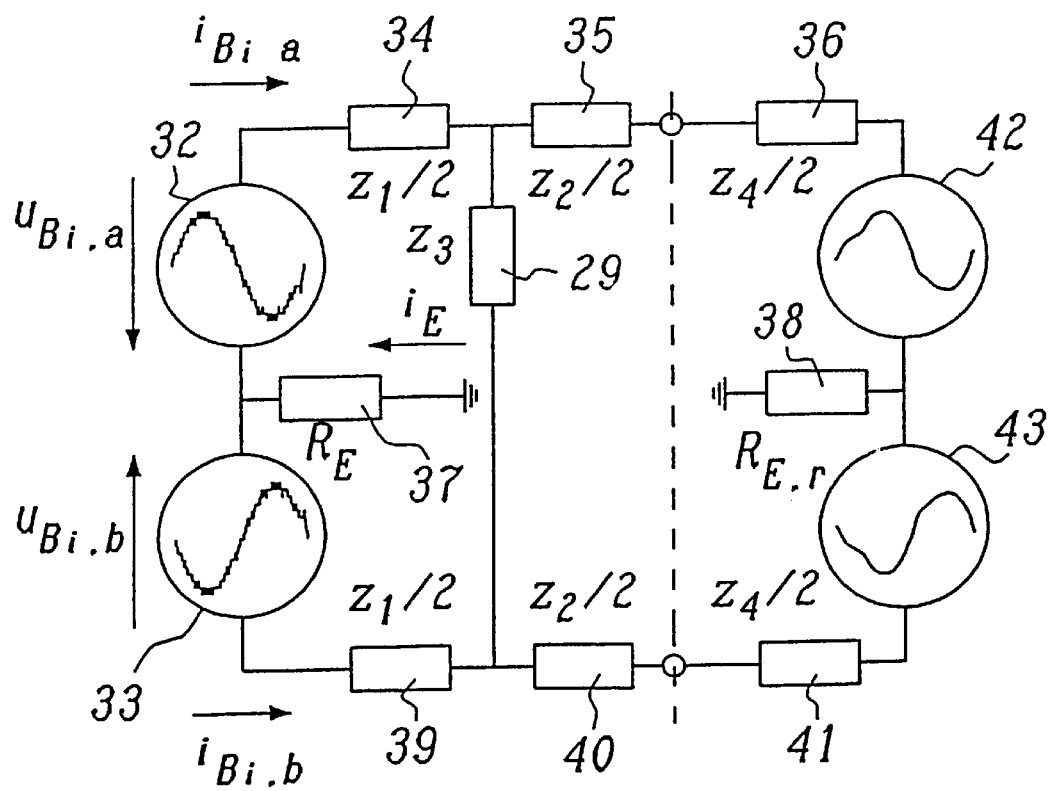
FIG. 6 shows the equivalent circuit diagram corresponding to FIG. 5 with center-point grounding.
Figure 7:
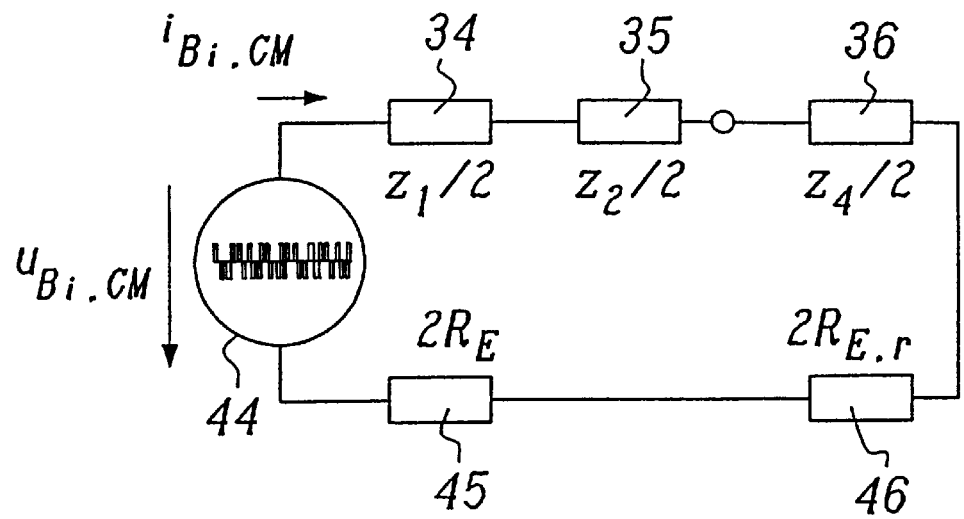
FIG. 7 shows the equivalent circuit diagram for the common mode subsystem derived from the equivalent circuit diagram of FIG. 6.
Figure 8:
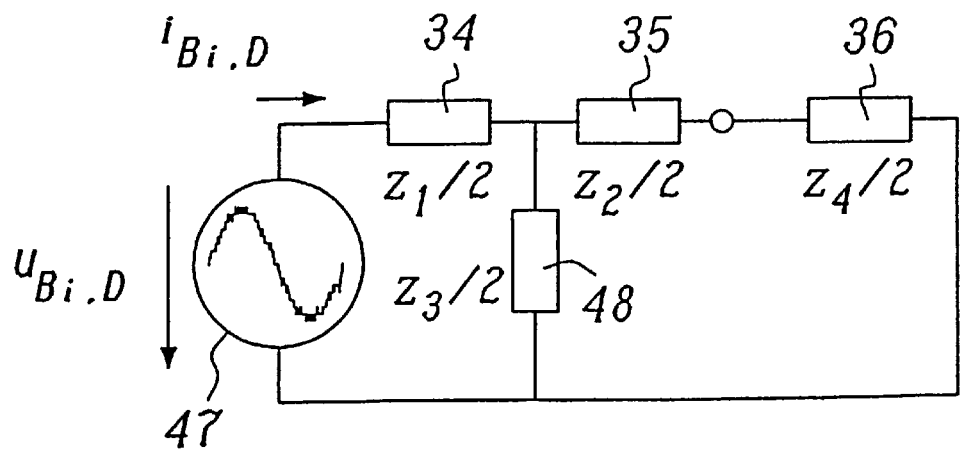
FIG. 8 shows the equivalent circuit diagram for the differential mode subsystem derived from the equivalent circuit diagram of FIG. 6.
Figure 9:
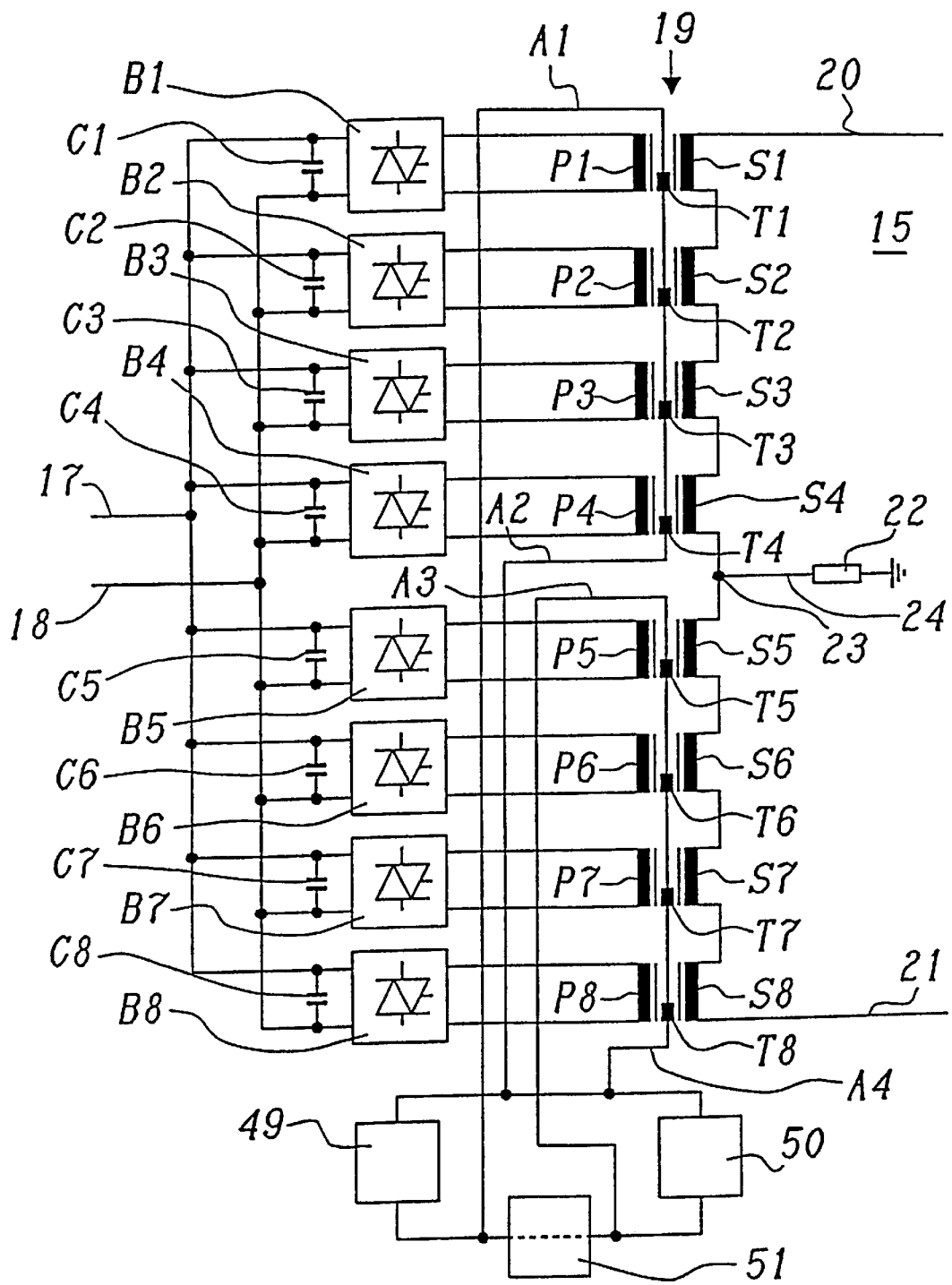
FIG. 9 shows a preferred exemplary embodiment of an invertor according to the invention with tertiary windings in the transformer which are combined to form two series circuits and are connected to a common mode filter and two AC filters.

Referring now to the drawings, wherein like reference numerals designate identical or corresponding parts throughout the several views, FIG. 9 represents a preferred exemplary embodiment of an invertor according to the invention. The invertor of FIG. 9 is largely similar in its structure to the invertor of FIG. 2. Here, too, in the transformer 19 a tertiary winding T1, . . . ,T8 is provided for each pair of primary and secondary windings P1, S1; . . . ;P8, S8. In order to be able to suppress the common mode voltages, the tertiary windings T1, . . . ,T8 are connected together with a common mode filter 51 in a specific manner.

Figure 10:
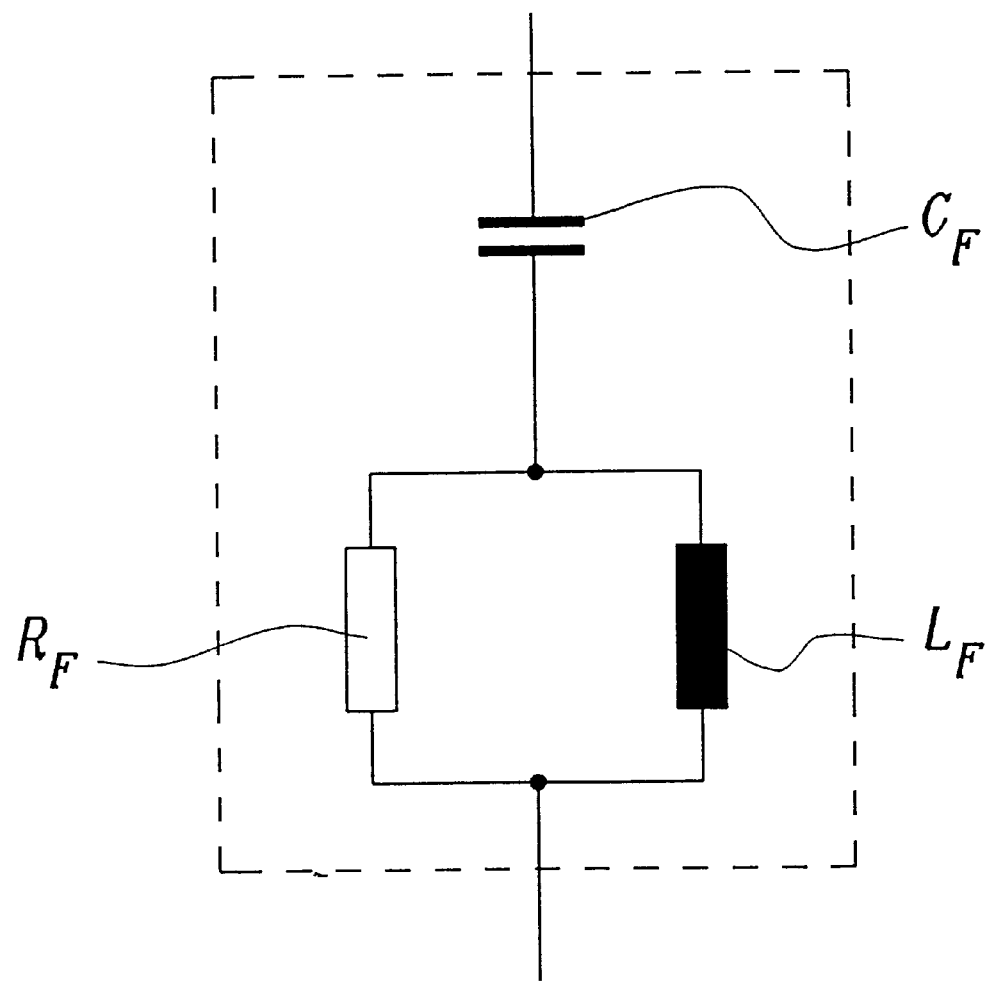
FIG. 10 shows the equivalent circuit diagram of a 2nd order high-pass filter of the kind that is preferably used as common mode filter and AC filter in the circuit according to FIG. 9.

To that end, the tertiary windings T1, . . . ,T4 above the center tap 23 and the tertiary windings T5, . . . ,T8 below the center tap 23 are in each case connected in series and form a first and second series circuit having mutually corresponding outputs A1, A3 and A2, A4. The second mutually corresponding outputs A2, A4 of the two series circuits are connected directly to one another. The common mode filter 51, on the other hand, is arranged between the first mutually corresponding outputs A1, A3 of the two series circuits. The common mode filter 51 is preferably designed as a 2nd order high-pass filter. Its equivalent circuit diagram is represented in FIG. 10 and comprises a filter capacitance $C_F$, a filter resistance $R_F$ and a filter inductance $L_F$. The common mode filter is designed such that the interfering common mode components with their harmonics are attenuated.

In addition to the novel task of suppressing or attenuating common mode components, the tertiary windings also remain available for conventional AC filtering. To that end, the filter circuit 25 is divided in accordance with FIG. 2 into two AC filters 49 and 50, which are each connected in parallel with one of the series circuits formed by the tertiary windings T1, . . . ,T8. The AC filters are likewise designed as 2nd order high-pass filters and preferably have the same filter topology (equivalent circuit diagram according to FIG. 10) as the common mode filter 51.

Alternatively, it is conceivable within the scope of the invention to omit the common mode filter 51 entirely and to connect the outputs A1 and A3 of the two series circuits formed by the tertiary windings T1, . . . ,T4 and T5, . . . ,T8 directly via the connection illustrated by dashes in FIG. 9, or to short-circuit the common mode filter 51. This makes it possible to simplify the circuit. However, the invertor is loaded by higher currents in many cases.

The invention has been explained in connection with a one-phase transformer in FIG. 9. However, it goes without saying that it can be applied correspondingly to a three-phase transformer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An invertor (15) comprising a plurality of invertor bridges (B1, . . . ,B8), which are connected in parallel on the same DC voltage intermediate circuit (14) and whose output voltages are summed via a transformer (19), which transformer has a number of primary windings (P1, . . . ,P8) and associated secondary windings (S1, . . . ,S8) which corresponds to the number of invertor bridges (B1, . . . ,B8), each invertor bridge (B1, . . . ,B8) being respectively connected on the output side to a primary winding (P1, . . . ,P8), and the secondary windings (S1, . . . ,S8) being connected in series for the purpose of summing the output voltages, and the invertor bridges (B1, . . . ,B8) each being driven with pulse duration modulation according to an auxiliary control voltage, and the auxiliary control voltages of the individual invertor bridges (B1, . . . ,B8) having a constant phase difference between one another, and the transformer (19) having a center tap (23), which is grounded via a ground connection (24), wherein, in order to attenuate or suppress in-phase or common-mode interference currents flowing via the ground connection (24) and the interference voltages associated with said interference currents, within the transformer (19), tertiary windings (T1, . . . ,T8) are assigned to the primary windings (P1, . . . ,P8) and to the secondary windings (S1, . . . ,S8), and the tertiary windings (T1, . . . ,T8) are connected to form a circuit in such a way that the undesirable common-mode interference voltages or interference currents are kept away from the power supply system and from the ground connection (24).

2. The invertor as claimed in claim 1, wherein each pair (P1, S1; . . . ;P8, S8) of primary and secondary windings is respectively assigned a tertiary winding (T1, . . . ,T8), wherein the tertiary windings (T1, . . . ,T4) above the center tap (23) and the tertiary windings (T5, . . . ,T8) below the center tap (23) are in each case connected in series, wherein the mutually corresponding outputs (A2, A4 and A1, A3) of the two series circuits are respectively connected together.

3. The invertor as claimed in claim 2, wherein the mutually corresponding outputs (A2, A4 and A1, A3) of the two series circuits are respectively connected together directly.

4. The invertor as claimed in claim 2, wherein the first mutually corresponding outputs (A2, A4) of the two series circuits are connected together directly, and wherein a common mode filter (51) is arranged between the second mutually corresponding outputs (A1, A3) of the two series circuits.

5. The invertor as claimed in claim 4, wherein the common mode filter (51) is designed as a 2nd order high-pass filter.

6. The invertor as claimed in claim 2, wherein an AC filter (49 and 50) is respectively connected in parallel with each of the series circuits formed by the tertiary windings (T1, . . . ,T4 and T5, . . . ,T8).

7. The invertor as claimed in claim 6, wherein the AC filters (49, 50) are designed as 2nd order high-pass filters.

8. The invertor as claimed in claim 7, wherein the common mode filter (51) and the AC filters (49, 50) have the same filter topology.

9. The use of an invertor as claimed in claim 1 in a converter (10) having a DC voltage intermediate circuit (14).

* * * * *